United States Patent [19]

Stinton

[11] 4,367,184

[45] Jan. 4, 1983

[54] MIXED URANIUM DICARBIDE AND URANIUM DIOXIDE MICROSPHERES AND PROCESS OF MAKING SAME

[75] Inventor: David P. Stinton, Knoxville, Tenn.

[73] Assignee: The United States of America as represented by the Department of Energy, Washington, D.C.

[21] Appl. No.: 217,356

[22] Filed: Dec. 17, 1980

[51] Int. Cl.³ .................. G21C 21/00; C09K 3/00
[52] U.S. Cl. ............................. 264/0.5; 252/636; 252/638; 252/639
[58] Field of Search ............ 252/636, 637, 638, 639, 252/642; 264/0.5; 376/411

[56] References Cited

U.S. PATENT DOCUMENTS

| | | | |
|---|---|---|---|
| 3,320,034 | 5/1967 | Strausberg | 252/642 X |
| 3,398,098 | 8/1968 | Hanson | 252/642 |
| 3,761,546 | 9/1973 | Wilhelm et al. | 252/639 |
| 4,261,935 | 4/1981 | Gutierrez et al. | 264/0.5 |

OTHER PUBLICATIONS

The Application of Thermochemical Principles to the Production of Nuclear Fuel Materials, pp. 79 to 86, published by G. R. Chilton in 1976 as special publication No. 30 of The Chemical Society, Burlington House, London, England.

Hennecke et al., Journal of Nuclear Materials, vol. 38, 1971, pp. 285 to 291.

The Kema U(YI) Process for the Production of $UO_2$ Microspheres published by J. Kanij et al., Presented at the IAEA Panel on Sol-gel Processes for Fuel Fabrication, Vienna, May 21 to 24, 1973, 13 pages.

Primary Examiner—Leland A. Sebastian
Attorney, Agent, or Firm—Edwin D. Grant; Stephen D. Hamel; Richard G. Besha

[57] ABSTRACT

Nuclear fuel microspheres are made by sintering microspheres containing uranium dioxide and uncombined carbon in a 1 mole percent carbon monoxide/99 mole percent argon atmosphere at 1550° C. and then sintering the microspheres in a 3 mole percent carbon monoxide/97 mole percent argon atmosphere at the same temperature.

5 Claims, 4 Drawing Figures

MIXED URANIUM DICARBIDE AND URANIUM DIOXIDE MICROSPHERES AND PROCESS OF MAKING SAME

BACKGROUND OF THE INVENTION

This invention, which was made under a contract with the U.S. Department of Energy, relates in general to nuclear reactor fuel and a method for manufacturing the same, and more specifically the invention provides a method for making nuclear fuel microspheres having a composition and density not heretofore attainable.

Fuels in the form of sintered microspheres containing a high percentage of $U^{235}$ have come into general use for nuclear power generation. However, such microspheres can readily be processed to provide fissile material for use in atomic weapons. To promote nuclear weapon control, the nuclear reactor fuel supplied to countries in need of nuclear power generating plants should be in a form that can only be diverted into use in atomic weapons by means of uranium-enriching facilities not generally available. A preferred form of nuclear fuel that can safely be supplied to energy-poor countries consists of high density microspheres produced from 20% enriched uranium and containing up to 30 mole percent $UC_2$ with the remainder in the form of $UO_2$.

PRIOR ART

Extensive investigations have been conducted to determine the nature of the uranium-carbon-oxygen nuclear fuel system with which the present invention is involved. The phase diagram for the system at temperatures in the range of 1300°–1750° C. has been developed in detail, and the preferred process embodiment of this invention will be described by reference to this diagram. The same U-C-O diagram has been previously considered in an article titled "The Application of Thermochemical Principles to the Production of Nuclear Fuel Materials" and published by G. R. Chilton in 1976 as Special Publication No. 30 of *The Chemical Society*, Burlington House, London, England. Carbothermic reduction of uranium dioxide, which is utilized in the preferred process of this invention, is also described in the aforesaid publication and in an article titled "Carbon Monoxide Equilibrium Pressures and Phase Relations During the Carbothermic Reduction of Uranium Dioxide" and published by J. F. A. Hennecke and H. L. Scherff in 1971 in the *Journal of Nuclear Materials* 38, North-Holland Publishing Company, Amsterdam, Holland.

SUMMARY OF THE INVENTION

It is an object of this invention to form microspheres containing uranium compounds in chemical forms and proportions suitable for use as nuclear reactor fuel but not conveniently adaptable for use in atomic weapons.

Another object of the invention is to provide a method for making nuclear fuel microspheres consisting essentially of about 1–30 mole percent uranium dicarbide and 70–99 mole percent uranium dioxide and the fuel having a density of about 10.2 to 11.0 g/cm³.

These objects are attained by a preferred process embodiment of the invention wherein microspheres containing uranium dioxide and uncombined carbon are first sintered at a temperature of 1550° C. in an atmosphere containing about 0.5 to 1 mole percent of carbon monoxide and then sintered at the same temperature in an atmosphere containing about 3 mole percent of carbon monoxide.

DETAILED DESCRIPTION

In the past nuclear reactor fuels containing highly enriched uranium (as much as 93% $U^{235}$) have been used, but as mentioned hereinbefore such fuels are undesirable because the uranium can easily be used in atomic weapons. The use of uranium of lower enrichment for reactor fuel involves manufacturing problems that are difficult to solve. For example, fuel microspheres made of highly enriched uranium may have a low density, whereas microspheres made of uranium containing less $U^{235}$ must have a high density. In addition, the form of the uranium in reactor fuel microspheres is of crucial importance. Microspheres consisting of $UO_2$ alone are unacceptable because under operational conditions in a reactor this material adversely affects a pyrolytic carbon coating that is applied to the microspheres for a purpose not important to an understanding of this invention. A composition consisting of $UC_2$ and $UO_2$ can be used to form dense reactor fuel microspheres that are not easily processed to supply fissile material for weapons. However, such $UC_2/UO_2$ microspheres must contain at least 15 mole percent $UO_2$ to prevent attack by fission products generated in the microspheres upon a SiC coating that is applied to the latter in addition to the previously mentioned carbon coating. An optimal combination of $UO_2$ and $UC_2$ prevents deterioration of both of the coatings. In accordance with this invention, microspheres having the desired composition of $UO_2$ and $UC_2$ and a high density are manufactured by a sintering process involving carbothermic reduction of $UO_2$ to $UC_2$ in an atmosphere consisting of CO and an inert gas. It is an important advantage of the invention that this manufacturing process occurs in such a way that neither uranium oxycarbide or uranium monocarbide is included in the fuel composition, since each of these compounds can cause damage, under operational conditions in a reactor, to the aforementioned pyrolytic carbon coating applied to fuel microspheres.

Figure 1:
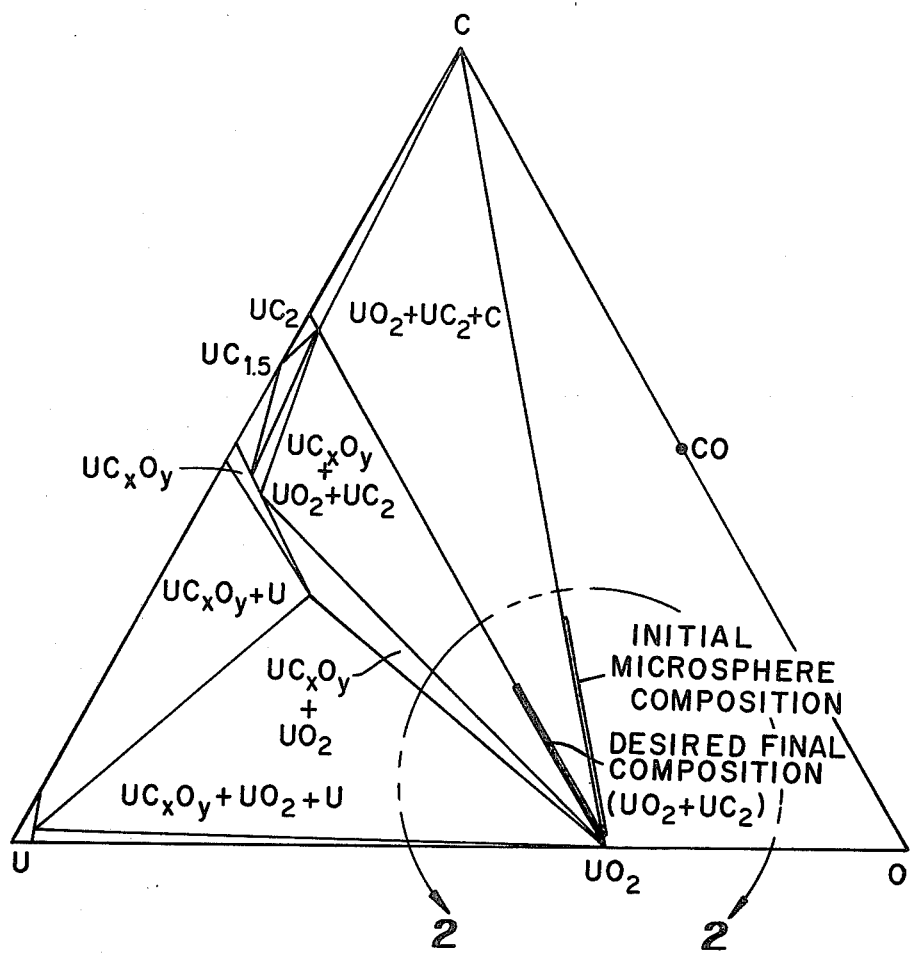
FIG. 1 is a phase diagram of the uranium-carbon-oxygen system at 1300°–1750° C.
Figure 2:
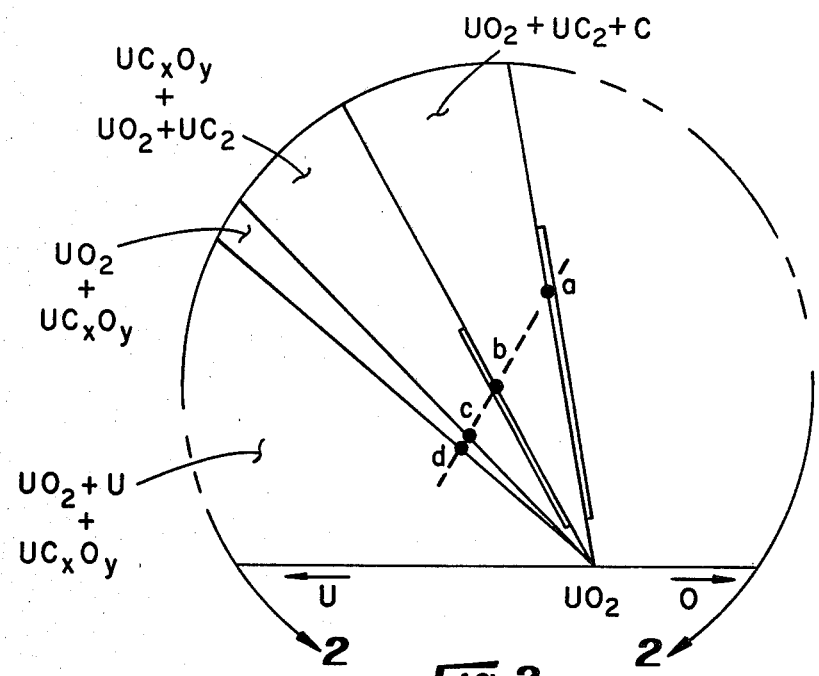
FIG. 2 is an enlargement of a portion of the diagram of FIG. 1, with reference letters designating points thereon that will be referred to in the following detailed description of the invention.

The preferred process of this invention can best be understood by reference to FIGS. 1 and 2 which illustrate the phase relationships of the U-C-O system between 1300° and 1750° C., the components in some of the phase regions of the diagram not being identified because they are not involved in the process. For use in a high temperature, gas-cooled reactor a composition consisting of 1 to 30 mole percent $UC_2$ is desirable. A percentage of $UC_2$ as high as 55 would be acceptable, but the required density of microspheres is difficult to achieve for $UC_2$ concentrations greater than 30%. The desired UC$_2$-UO$_2$ composition range is located along the line joining UC$_2$ and UO$_2$ on the phase diagram and is represented by a narrow rectangular area at the lower portion of this tie line. The UC$_2$ phase actually contains a minor amount of oxygen and has a composition of UC$_{1.83}$O$_{0.075}$. Three phase fields are involved in a carbothermic reduction process which occurs in the portion of the diagram where the desired UC$_2$/UO$_2$ composition range is located. One compatibility triangle includes the phases UO$_2$, UC$_2$, and carbon, the UC$_2$ containing a minor amount of oxygen as stated above. A composition within this triangle would not be acceptable for use as fuel in a high temperature, gas-cooled reactor because of the free carbon therein, which would drastically reduce the density of sintered microspheres formed of the composition. A second compatibility triangle of interest includes the previously mentioned UC$_2$ and UO$_2$ phases plus uranium oxycarbide, the latter being represented as UC$_x$O$_y$. A composition within this triangle is unacceptable because of the presence of UC$_x$O$_y$, since, as stated earlier, uranium oxycarbide can cause damage to the pyrolytic carbon coating applied to fuel microspheres. The last compatibility triangle that must be considered in connection with the invention is the region that includes UC$_x$O$_y$ and UO$_2$. A microsphere composition in this two-phase region is again unacceptable because of the presence of UC$_x$O$_y$.

The reaction occurring during the carbothermic reduction process involved in this invention is represented by the following equation:

$$UO_2 + 4C = UC_2 + 2CO$$

The composition after calcination of microspheres usable in the carbothermic reduction process of the invention can include 45 to 97 mole percent UO$_2$ and 3 to 55 mole percent free carbon. This range is located along the line joining C and UO$_2$ on the phase diagram and is represented by a bracket at the lower portion of the tie line. Microspheres having a UO$_2$—C composition within the stated range (which will be referred to hereinafter as precursor microspheres) have been formed by a process similar to the process described in an article titled "The KEMA U(VI) Process for the Production of UO$_2$ Microspheres," which was published by J. Kanij, A. Noothout and O. Votocek in May, 1973, in connection with a symposium relating to sol-gel processes for forming nuclear fuel. The solutions used in the above-identified KEMA process can be used to form precursor microspheres, which by means of this invention can be converted into nuclear fuel microspheres usable in a high temperature, gas-cooled reactor, by adding carbon black to the KEMA components. However, the steps that have been used to form precursor microspheres usable in the process of this invention are described in the following paragraph only as an example of a suitable method for making the precursor microspheres, and other means can optionally be used to produce microspheres within the UO$_2$-C range stated above.

To obtain precursor microspheres, 0.2 gram of a dispersing agent (e.g., Marasperse CB or Marasperse CBOS-6) can be dissolved in 171 ml of a 3.12 molar solution of hexamethylenetetramine and water and then 5.37 grams of carbon black having an average particle size of 24×10$^{-3}$ μm and a surface area of 138 m$^2$/g (e.g., carbon black available from Cabot Corporation under the name Black Pearls L) is added while the solution is being agitated by a Branson ultrasonic vibrator, the temperature of the solution being held below 30° C. during dispersion of the carbon. The temperature of the hexamethylenetetramine-carbon mixture is reduced to 5° C. and it is then mixed with 175 ml of an aqueous solution containing acid-deficient uranyl nitrate (2.43 molar) and urea (3.04 molar), the temperature of the uranyl nitrate-urea solution being at −5° C. prior to mixing. The resulting mixture is discharged from a vibrating nozzle into trichloroethylene at a temperature of 65° C. to form microspheres having a diameter in the range of 300–400 microns, in accordance with known procedures used in the sol-gel process of forming nuclear fuel microspheres. Preferably the microspheres thus formed are aged in the trichloroethylene for 20 minutes, and after being separated from the liquid they are dried by use of an air stream, washed with 0.5 molar ammonium hydroxide, again purged with air, and finally heated in an oven at 250° C. to complete drying. The dried microspheres are calcined at 450° C. to convert UO$_3$ therein to UO$_2$ and thereby provide precursor microspheres having a composition of UO$_2$ and free carbon within the range given above.

Figure 3:
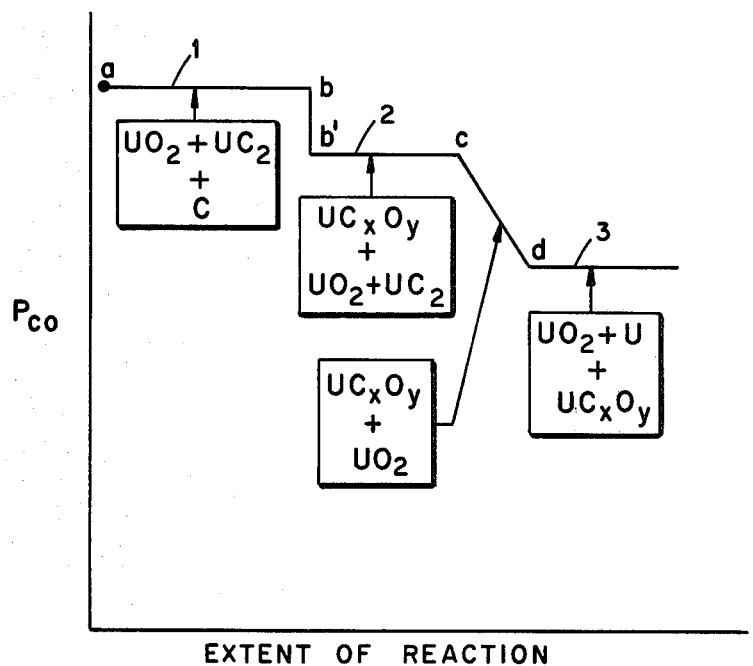
FIG. 3 is a graph illustrating the relationship between carbon monoxide pressure and the extent of reaction for phases of the uranium-carbon-oxygen system involved in this invention.

In accordance with this invention, microspheres having a UO$_2$-C composition within the stated range are sintered at 1550° C. in a continuously flowing atmosphere consisting of argon and carbon monoxide, the molar percentage of CO in the atmosphere being varied in a manner described hereinafter. Since the CO-Ar atmosphere is continuously removed from the furnace in which the UO$_2$-C microspheres are sintered, the carbothermic reduction reaction proceeds toward UC$_2$. In the portion of the U-C-O phase diagram shown in FIG. 2, the letter a designates a microsphere composition of UO$_2$ and free carbon which is suitable as an initial composition for forming microspheres in accordance with the invention (namely, a composition in the middle of the range of UO$_2$-C usable in the process of the invention). As the carbothermic reduction of the initial UO$_2$/C composition proceeds, the composition of the microspheres will change to include different amounts of UO$_2$, UC$_2$, and free C, these compositions lying on the broken line between points a and b. The amount of free C in the microspheres will gradually decrease until point b is reached, when the microspheres will contain only UC$_2$ and UO$_2$. The composition of the microspheres can also be varied along the broken line between points b, c and d, and beyond point d, as determined by partial pressure of CO in the CO/inert gas atmosphere present in the furnace in which the microspheres are sintered. This dependence of the composition of the microspheres on the CO partial pressure in the furnace atmosphere is depicted in FIG. 3, wherein the initial composition of UO$_2$+free C is represented as point a. The composition moves into the three-phase region UO$_2$+UC$_2$+C (toward point b in FIG. 2) only if the partial pressure of CO(P$_{CO}$) in the furnace atmosphere is less than level 1 in FIG. 3. According to the Gibbs phase rule, there is one degree of freedom within the three-phase region. Therefore for a given temperature, the equilibrium pressure of CO is constant and independent of the quantities of the three solid phases. When the tie line joining UC$_2$ and UO$_2$ is reached at point b, the equilibrium CO pressure will drop to a lower level (at point b' in FIG. 3). The equilibrium CO pressure over the three-phase region UC$_x$O$_y$+UO$_2$+UC$_2$ is also constant (level 2 in FIG. 3 between points b' and c). The reaction will proceed into this three-phase region only if the $P_{CO}$ in the furnace atmosphere is less than level 2 in FIG. 3. The reaction will continue into the two-phase region $UO_2+UC_xO_y$ if the $P_{CO}$ in the furnace is less than level 2. The Gibbs phase rule shows that there are two degrees of freedom in a two-phase region. Therefore at any temperature $P_{CO}$ over the $UO_2$ and $UC_xO_y$ will vary as the quantity of the two solid phases varies (line c—d in FIG. 3). Therefore the final composition of microspheres sintered in an atmosphere containing CO can be controlled by regulating the partial pressure of CO in the gas stream entering the sintering furnace. If the $P_{CO}$ is above level 1, no reaction will occur. If the $P_{CO}$ is between level 1 and level 2, $UO_2$ and $UC_2$ will be produced. If the $P_{CO}$ is between level 2 and level 3, the reaction will proceed into the $UO_2+UC_xO_y$ phase region.

Figure 4:
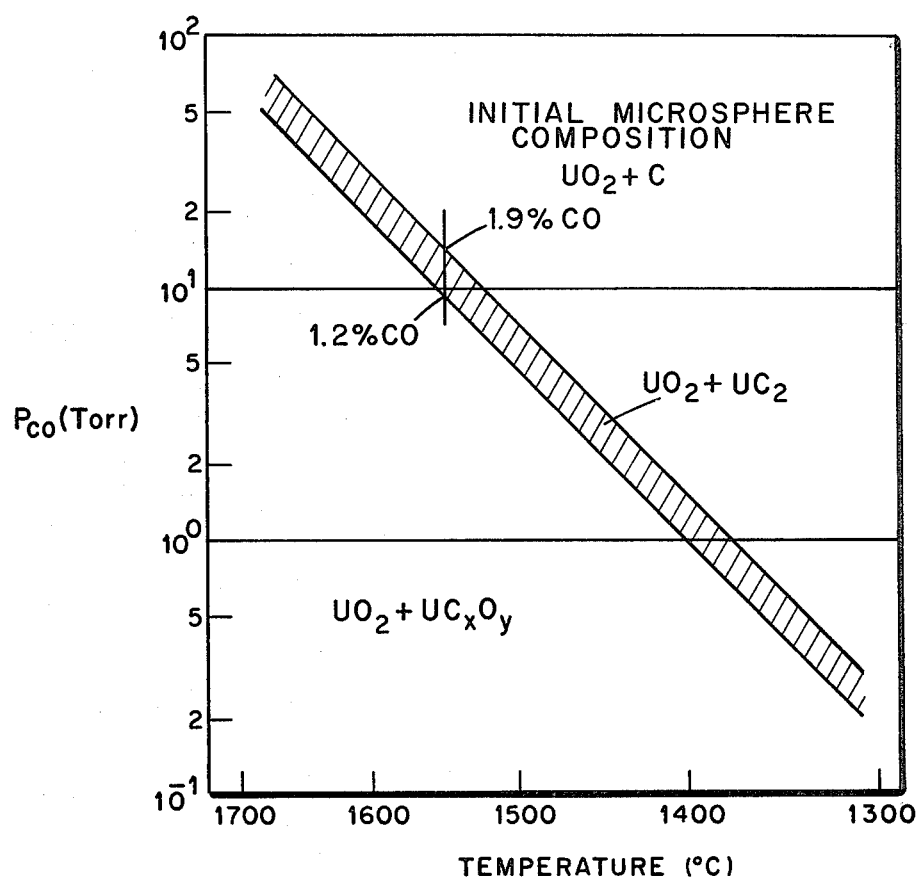
FIG. 4 is a graph illustrating the relationship between three phases of the uranium-carbon-oxygen system, the partial pressure of carbon monoxide over these phases, and temperature.

FIG. 4 illustrates the above-described process conditions with greater particularity. Thermodynamic data for the U-C-O system show that atmospheres containing from about 1.2 to 1.9% CO will produce the phases $UO_2$ and $UC_2$ at 1550° C. A sintering atmosphere containing less than 1.2% CO will produce $UO_2$ and $UC_xO_y$ while an atmosphere containing more than 1.9% CO will produce no reaction and leave $UO_2$ and carbon in microspheres placed in such an atmosphere. Thus at a temperature of 1550° C. the value 1.9% CO corresponds to level 1 of FIG. 3 and the value 1.2% CO corresponds to level 2 of FIG. 3.

In accordance with this invention microspheres having the composition of $UO_2$ and free carbon represented by point a in FIG. 2 are initially sintered in a furnace under a flowing gas consisting of about 0.5 to 1 mole percent CO and 99% to 99.5% Ar, which causes the microsphere composition to change to $UO_2$ plus $UC_xO_y$. This process step produces microspheres of very high density (approaching 11 g/cm$^3$). It would not be desirable to change the composition of the microspheres to $UO_2+UC_2$ directly by use of an atmosphere comprising between 1.2 to 1.9% CO because microspheres so produced would have an unacceptable low density (5–8g/cm$^3$). It would appear from examination of FIG. 4 that a second sintering period at 1550° C. under an atmosphere containing more than 1.9% CO would change the composition of the microspheres back to $UO_2+$free carbon. However, it has been found that sintering the microspheres which have been converted to $UO_2+UC_xO_y$ at a temperature of 1550° C. under an atmosphere consisting of 3 mole percent CO and 97 mole percent Ar instead produces microspheres containing $UC_2$ and $UO_2$ within the desired composition range of 1–30 mole percent $UC_2$ and 70–99 mole percent $UO_2$. Furthermore these microspheres have the required high density in the range of about 10.2 to 11.0 g/cm$^3$.

A sintering furnace used in forming reactor fuel microspheres in accordance with this invention can consist of a tube furnace having a diameter of 3.8 cm. Molybdenum carbide crucibles can be used to hold the microspheres to prevent any reaction between $UO_2$-$UC_2$ and the crucible. The microspheres in the furnace are exposed to a flowing atmosphere containing accurately controlled amounts of CO and Ar. Microspheres containing between 45 to 97 mole percent $UO_2$ and between 3 to 55 mole percent free carbon are first sintered at 1550° C. in a flowing atmosphere consisting of 1 mole percent CO and 99 mole percent Ar for 4 hours. The microspheres are then sintered at 1550° C. in a flowing atmosphere consisting of 3 mole percent CO and 97 mole percent Ar for an additional 4 hours. By way of example, the following microsphere compositions were obtained by the above-described process steps.

| SAMPLE | INITIAL MOLE % $UO_2$ | INITIAL MOLE % C | FINAL MOLE % $UO_2$ | FINAL MOLE % $UC_2$ | FINAL DENSITY g/cm$^3$ |
|---|---|---|---|---|---|
| 1 | 69.9 | 30.1 | 88.9 | 11.1 | 10.29 |
| 2 | 60.4 | 39.6 | 83.5 | 16.5 | 10.22 |
| 3 | 54.9 | 45.1 | 79.7 | 20.3 | 10.72 |
| 4 | 53.2 | 46.8 | 77.5 | 22.5 | 10.64 |

The composition of the $UO_2$-$UC_2$ microspheres obtained by the described process steps was established by chemical analysis and x-ray diffraction procedures.

I claim:

1. A process for forming nuclear reactor fuel comprising the steps of:
    sintering microspheres containing uranium dioxide and free carbon in an atmosphere consisting essentially of an inert gas and carbon monoxide at such carbon monoxide concentration and at such temperature that high density microspheres consisting essentially of uranium dioxide and uranium oxycarbide are formed; and
    sintering said uranium dioxide/uranium oxycarbide microspheres in an atmosphere consisting essentially of an inert gas and carbon monoxide at such carbon monoxide concentration and at such temperature that microspheres having a density of about 10.2 to 11.0 g/cm$^3$ and consisting essentially of about 1–30 mole percent uranium dicarbide and 70–99 mole percent uranium dioxide are formed.

2. The process of claim 1 wherein said microspheres containing uranium dioxide and free carbon are sintered at a temperature of about 1550° C. in an atmosphere consisting of less than 1.2 mole percent carbon monoxide, and said microspheres containing uranium dioxide and uranium oxycarbide are sintered at a temperature of about 1550° C. in an atmosphere consisting of more than 1.9 mole percent carbon monoxide.

3. The process of claim 2 wherein said microspheres containing uranium dioxide and free carbon are sintered in an atmosphere consisting of about 0.5 to 1 mole percent carbon monoxide, and said microspheres containing uranium dioxide and uranium oxycarbide are sintered in an atmosphere consisting of about 3 mole percent carbon monoxide.

4. The process of claim 3 wherein said microspheres containing uranium dioxide and free carbon and said microspheres containing uranium dioxide and uranium oxycarbide are each sintered for about 4 hours under the stated conditions.

5. Nuclear reactor fuel microspheres consisting essentially of about 1–30 mole percent uranium dicarbide and 70–99 mole percent uranium dioxide and having a density in the range of about 10.2–11.0 g/cm$^3$.

* * * * *